J. P. ADAMS.
Butter Worker.
No. 54,272.
Patented May 1, 1866.
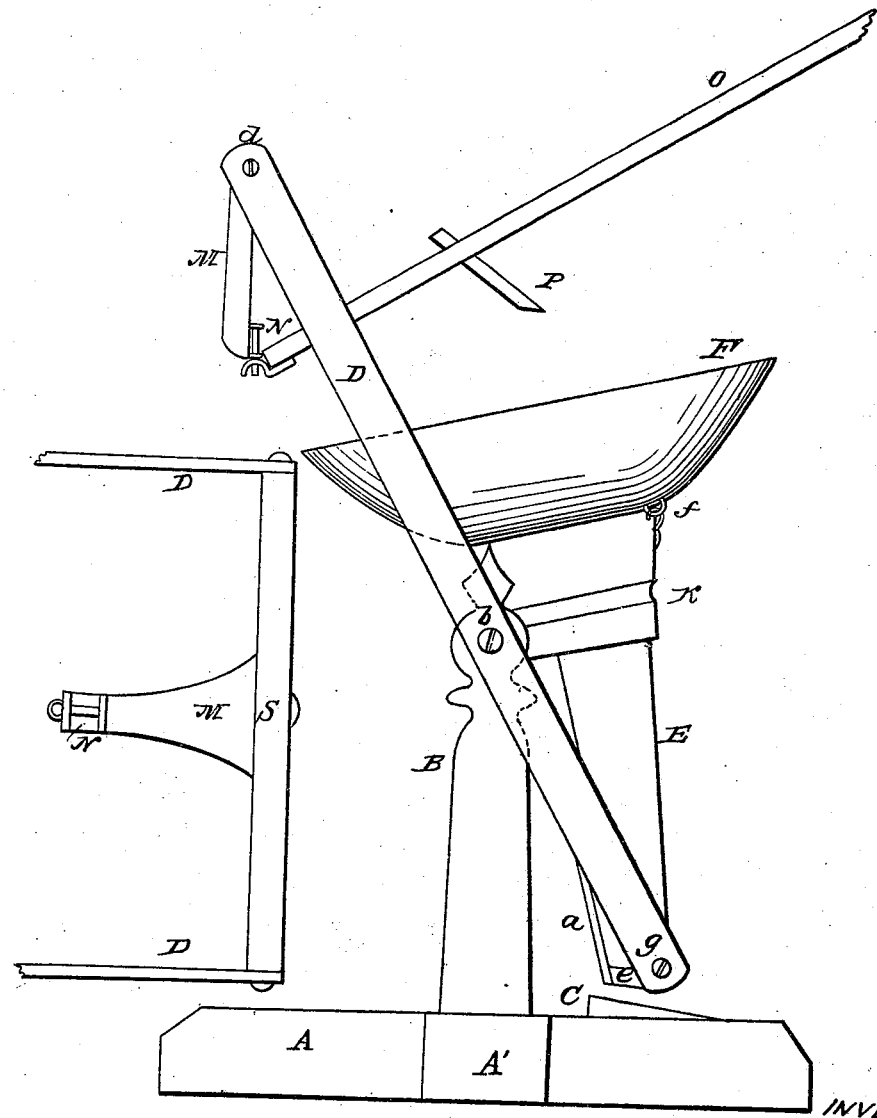

UNITED STATES PATENT OFFICE.

J. P. ADAMS, OF WHITNEY'S POINT, NEW YORK.

IMPROVEMENT IN BUTTER-WORKERS.

Specification forming part of Letters Patent No. 54,272, dated May 1, 1866.

*To all whom it may concern:*

Be it known that I, J. P. ADAMS, of Whitney's Point, county of Broome, and State of New York, have invented certain new and useful Improvements in Butter-Workers; and I do hereby declare that the following is a full, clear, and exact description of the same, reference being had to the accompanying drawings and the letters of reference marked thereon, making a part of this specification.

A A' represent the base of this worker, which is two bars crossing each other and connected together at their centers. Upon the bar A' there is an upright, B. On each end of said bar, and upon the upper side of the bar A, there is a spring, C, to be used for the purposes hereinafter described.

D represents the swinging frame. This frame is made similar to the ordinary frames, being composed of four pieces—two side pieces and two end pieces—of timber. This frame is secured to the uprights B by a turning brace, K, the ends of said brace passing through the uprights B near their tops, where the frame D is pivoted, as seen at *b*.

E represents a small pillar which is larger at the top than at the bottom, and is made so as to revolve. This pillar passes through the turning brace K and rests upon the bottom piece of frame D. Upon the top or head of this pillar is the bowl F. This bowl is made in any of the ordinary or known ways, and is secured to the top of the pillar E by hooks *f*, and can be taken off from the frame when desired. The topmost connecting-piece of the frame D is pivoted, as seen at *d*, and made to turn. At the center of this piece is a pendent arm, M, secured and made stationary. At the lower extremity of said arm there is a swivel-joint, N, to which is attached, by means of a hook, the handle O, with paddle P, by which the butter is worked. This frame D is made more secure by a connecting-brace, *a*, which is firmly attached to the turning brace K and the bottom of frame D at *e*.

The butter to be worked is placed within the bowl F, when the handle O is carried back and forth, causing the paddle P to press and work the butter. The handle O is allowed to be drawn to and fro by the bar S or upper piece of the frame D, the spring C on bar A of the base holding the entire frame D in a secure manner. When it is necessary to extract the bowl from the frame it can be done by unhooking the same, or, whenever necessary to empty the milk and water from the bowl, by pressing upon the spring C the frame D can be carried around in a suitable curve and the water thrown from bowl, the turning brace K allowing the frame to make a part revolution.

It will be understood that this invention is an improvement upon the patent granted me in 1865, and differs from that in having the frame D pivoted to the uprights B, as shown at *b*, a little below the center of said frame; also in having a rock-shaft, S, connecting the upper ends of the frame D, instead of a stationary bar; and also in having an arm, M, permanently secured to the rock-shaft S, on the lower end of which arm is a swivel-joint for connecting the handle O to it.

By this arrangement I make a worker which is more convenient and more easily operated, as also one better adapted to the purpose for which it is designed, than the former patent issued to me.

Having thus fully described my invention, what I claim as new, and desire to secure by Letters Patent, is—

The arrangement of the frame D, pivoted at *b*, the rock-shaft S, the arm M, and the swivel-joint N, used with the bowl F and its connections, substantially as and for the purpose herein specified.

As evidence that I claim the foregoing I have hereunto set my hand in the presence of two witnesses.

J. P. ADAMS.

Witnesses:
H. M. WHITE,
H. N. HINE.